US010893109B2

(12) United States Patent
Noldus

(10) Patent No.: US 10,893,109 B2
(45) Date of Patent: *Jan. 12, 2021

(54) METHOD, DEVICE, NETWORK ENTITY AND COMPUTER PROGRAM PRODUCT FOR PROVIDING AN IP SERVICE APPLICATION

(71) Applicant: Telefonaktiebolaget LM Ericsson (publ), Stockholm (SE)

(72) Inventor: Rogier August Caspar Joseph Noldus, Goirle (NL)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 39 days.

This patent is subject to a terminal disclaimer.

(21) Appl. No.: 15/845,304

(22) Filed: Dec. 18, 2017

(65) Prior Publication Data
US 2018/0109635 A1    Apr. 19, 2018

Related U.S. Application Data

(63) Continuation of application No. 14/395,346, filed as application No. PCT/NL2012/050268 on Apr. 20, 2012, now Pat. No. 9,876,863.

(51) Int. Cl.
*G06F 15/173* (2006.01)
*G06F 15/16* (2006.01)
(Continued)

(52) U.S. Cl.
CPC .......... *H04L 67/16* (2013.01); *H04L 61/1511* (2013.01); *H04L 61/2575* (2013.01);
(Continued)

(58) Field of Classification Search
CPC . H04L 61/1511; H04L 61/2575; H04L 67/16; H04L 65/1059; H04L 65/1083; H04W 8/18
(Continued)

(56) References Cited

U.S. PATENT DOCUMENTS 7,373,644 B2    5/2008 Aborn
7,725,602 B2 *  5/2010 Liu ................... H04L 61/1511
                                            709/217
(Continued)

FOREIGN PATENT DOCUMENTS

CN    101192939 A    6/2008
CN    102027726 A    4/2011
(Continued)

*Primary Examiner* — Bharat Barot
(74) *Attorney, Agent, or Firm* — Murphy, Bilak & Homiller, PLLC

(57) ABSTRACT

Method, device, network and network entity for providing at least one Internet Protocol, IP, service application from a subscriber's multimedia device in an IP multimedia network. The method comprises executing at least one IP service application on the device and/or on an auxiliary device associated with the device. A Domain Name System, DNS, service is provided being executed on the device the DNS service relating to a domain associated with the subscriber. The DNS service has a memory associated therewith. In the memory information is stored relating to DNS resource records in accordance with the at least one IP service application that is being executed on the device and/or in the auxiliary device at that moment. An indication of the device's capability to execute a DNS service is deposited with the IP multimedia network. The indication comprises a network address on which the DNS service can be reached for a DNS query.

22 Claims, 11 Drawing Sheets

(51) Int. Cl.
*H04L 29/08* (2006.01)
*H04L 29/12* (2006.01)
*H04L 29/06* (2006.01)
*H04M 3/22* (2006.01)
*H04W 8/04* (2009.01)
*H04W 8/18* (2009.01)

(52) U.S. Cl.
CPC ...... *H04L 65/1059* (2013.01); *H04L 65/1073* (2013.01); *H04L 65/1083* (2013.01); *H04L 67/02* (2013.01); *H04M 3/2263* (2013.01); *H04W 8/04* (2013.01); *H04W 8/18* (2013.01); *H04L 61/1588* (2013.01); *H04L 61/305* (2013.01)

(58) Field of Classification Search
USPC ............ 709/202–203, 217–219, 225–229, 709/245–246
See application file for complete search history.

(56) References Cited

U.S. PATENT DOCUMENTS

| | | | |
|---|---|---|---|
| 7,957,373 B2 | 6/2011 | Ku et al. | |
| 8,032,632 B2* | 10/2011 | Blinn | H04L 61/1511 709/225 |
| 8,090,766 B2* | 1/2012 | DePue | H04L 61/1511 709/203 |
| 8,196,163 B2 | 6/2012 | Foti | |
| 8,504,729 B2 | 8/2013 | Pezzutti | |
| 8,780,738 B2* | 7/2014 | Strahs | H04L 12/66 370/252 |
| 9,876,863 B2* | 1/2018 | Noldus | H04L 61/1511 |
| 10,164,851 B2* | 12/2018 | Boucadair | H04L 43/12 |
| 2003/0105865 A1 | 6/2003 | McCanne et al. | |
| 2005/0249152 A1* | 11/2005 | Kiss | H04L 61/1511 370/328 |
| 2010/0030914 A1* | 2/2010 | Sparks | H04L 61/1511 709/235 |
| 2010/0049856 A1 | 2/2010 | Wright et al. | |
| 2010/0146132 A1 | 6/2010 | Morris | |
| 2010/0169483 A1 | 7/2010 | Jalkanen | |
| 2010/0250662 A1 | 9/2010 | Agarwal et al. | |
| 2011/0282904 A1 | 11/2011 | Schaedler et al. | |
| 2013/0205018 A1 | 8/2013 | Rahman et al. | |
| 2014/0129728 A1* | 5/2014 | Alex | H04L 61/1511 709/228 |
| 2016/0050178 A1 | 2/2016 | Frydman et al. | |

FOREIGN PATENT DOCUMENTS

| | | |
|---|---|---|
| CN | 102356617 A | 2/2012 |
| WO | 2011046348 A2 | 4/2011 |
| WO | 2011097179 A2 | 8/2011 |
| WO | 2012038445 A1 | 3/2012 |

* cited by examiner

METHOD, DEVICE, NETWORK ENTITY AND COMPUTER PROGRAM PRODUCT FOR PROVIDING AN IP SERVICE APPLICATION

RELATED APPLICATIONS

This application is a continuation of U.S. application Ser. No. 14/395,346, filed Oct. 17, 2014, which is a U.S. National Phase Application of PCT/NL2012/050268, filed Apr. 20, 2012. The entire contents of each of the aforementioned applications are incorporated herein by reference.

TECHNICAL FIELD

The invention relates to Internet Protocol multimedia networks. The invention also relates to subscriber's multimedia devices.

BACKGROUND

Internet Protocol (IP) communications from one subscriber's terminal to another subscriber's terminal is known. In IP based communications over an IP network. IP services are provided to subscribers. When the subscriber's terminals are multimedia terminals, e.g. multimedia phones, such IP services e.g. relate to multimedia components provided as enhancement for voice over IP communication. It is known to enhance a voice call with one or more multimedia components, such as video sharing, still picture sharing, music sharing, calendar sharing, file transfer etc. This is sometimes referred to as 'Enriched communication'. These multimedia components in the call are facilitated through an IP session, e.g. based on an IP Multimedia Subsystems (IMS) network. Calling party and called party may during establishment of the call exchange their respective capability for such IP based multimedia enhancement to the call. This capability includes, among others, an IP address to be used for the communication.

It is observed that with the prior art it is not possible to request the execution of an Internet Protocol (IP) service application of a subscriber's multimedia terminal, such as an IP Multimedia Subsystem (IMS) terminal, outside the context of an existing IP communication session (e.g. voice call).

The only exception in the prior art is formed by Session Initiation Protocol (SIP) based services. The SIP terminal deposits its contact address, viz. IP address, at a registrar, in an IMS network formed by a Serving Call Session Control Function (S-CSCF) entity. This IP address is used for establishing a SIP session. The terminal hence executes a SIP service application, in the sense that it can receive an initial SIP transaction. Receiving the initial SIP transaction constitutes a request for the execution of an IP service, such as establishing a communication session or accepting an Instant message.

Besides SIP based communication services, there is no general mechanism for a subscriber's multimedia terminal, such as an IMS terminal, to offer IP based communication services such as a hypertext transfer protocol (HTTP) service, a Mail server, or a File Transfer Protocol (FTP) service.

SUMMARY

It is an object of the invention to obviate at least some of the above disadvantages and provide an improved device for telecommunications. It is also an object to provide a subscriber's multimedia device for an IP multimedia network providing more versatility. It is also an object to provide functionality of a subscriber's multimedia device for an IP multimedia network providing more versatility.

Thereto, according to the invention is provided a method for providing at least one IP service application from a subscriber's multimedia device in an IP multimedia network. The method comprises the step of executing at least one IP service application on the device and/or on an auxiliary device associated with the device. Further, a Domain Name System (DNS) service is provided being executed on the device. The DNS service relates to a domain associated with the subscriber. The DNS service has a memory associated therewith. Further, information relating to DNS resource records in accordance with, i.e. needed for accessing, the at least one IP service application that is being executed on the device and/or in the auxiliary device is stored in the memory at that moment. Further, an indication of the device's capability to execute a DNS service comprising a network address on which the DNS service can be reached for a DNS query is deposited with the IP multimedia network.

Hence it is the subscriber's multimedia device that executes the DNS service, i.e. the device takes the role of DNS server for the domain related to the user of that device. This is of advantage, since it is the subscriber's multimedia device where IP service applications are dynamically installed and removed, activated and de-activated, with an IP address(es) that will differ over time. Therefore it is the device that is best equipped to provide information about available IP service applications on that device.

It will be appreciated that the device can be mobile or fixed. Also the auxiliary device cab be mobile or fixed.

It will also be appreciated that the device can be a human operated device, such as a subscriber's terminal, or a non-human operated device.

The aspect that the indication of the device's capability to execute a DNS service comprises a network address on which the DNS service can be reached for a DNS query provides the advantage that the IP multimedia network with which this indication is deposited is aware of the network address on which the DNS service can be reached. Hence, a DNS query for the domain associated with the subscriber can efficiently be forwarded to the DNS service being executed on the subscriber's multimedia device.

Optionally, the indication is deposited with the IP multimedia network during registration. Depositing this indication with the IP network during registration provides the advantage that the indication is deposited with the IP multimedia network at a moment that the device is already supposed to deposit information with the network.

According to an aspect, the information relating to DNS resource records in accordance with the at least one IP service application that is being executed on the device and/or in the auxiliary device includes information required for accessing the IP service application, such as an IP address at which the IP service application can be accessed. Hence, the information provides information as to where to access the IP service application.

According to an aspect the DNS service is executed in a DNS server on the multimedia device. Hence, the device can be provided with a dedicated hardware unit for performing the desired DNS server functionality.

Optionally, the IP multimedia network is an IMS network.

Optionally, the method includes routing a DNS query destined for the DNS service executed on the multimedia device to an authoritative DNS name server for the domain associated with a group of users. The device is associated with a member of said group of users. The DNS name server is configured to forward all DNS queries destined for a sub-domain of that domain to the Home Subscriber Server, HSS, of the IMS operator serving users associated with the domain. The HSS is acting as authoritative name server for the DNS service(s) executed on the multimedia device(s) of the user(s) associated with the sub-domain of that domain, which provides the advantage that DNS iterative query forwarding can be used.

The invention also relates to a subscriber's device being a multimedia device for an IP multimedia network. The device, or an auxiliary device communicatively connectable to the device, comprises a processing unit arranged for executing at least one IP service application. The device further includes a DNS query receiver for receiving a DNS query. The device further includes a requesting unit for requesting an identifier of the at least one IP service application. The identifier can include a network address at which the at least one IP service application is accessible. The device comprises the processing unit arranged for executing a DNS service and a memory arranged for storing information relating to DNS resource records in accordance with IP service applications that are being executed on the device at that moment. The device further includes a depositing unit arranged for depositing, e.g. during registration, with the multimedia network, an indication of the device's capability to execute the DNS service. The indication includes a network address on which the DNS service can be reached for a DNS query.

The invention also relates to an IP multimedia network including a multimedia device, or a combination of a multimedia device and an auxiliary device, and a network entity, wherein the network entity is arranged for storing the indication of the device's capability to execute a DNS service. The network entity acts as authoritative name server for a domain including a plurality of sub-domains, each sub-domain being associated with a subscriber's public address, each subscriber being associated with a subscriber device.

The invention also relates to a network entity, such as an HSS, for an Internet Protocol, IP, multimedia network, wherein the network entity is arranged for receiving and storing an indication of a device's capability to execute a DNS service, the network entity acting as authoritative name server for a domain including a plurality of sub-domains, each sub-domain being associated with a subscriber's public address, each subscriber being associated with a subscriber device.

The invention also relates to a computer program product executable on a programmable subscriber's multimedia device. The computer program product includes software code portions arranged for performing, when run on a programmable subscriber's Multimedia device, the following steps. Determining the presence of at least one IP service application that is being executed on the device and/or on an auxiliary device associated with the device at that moment. Providing on the device a DNS service relating to a domain associated with the subscriber. The DNS service has a memory, e.g. of the device, associated therewith. Storing in the memory information relating to DNS resource records in accordance with, i.e. needed for accessing, the at least one IP service application that is being executed on the device and/or in the auxiliary device at that moment. Instructing the device to deposit, with a multimedia network with which the device is registered or requests to be registered, an indication of the device's capability to execute a DNS service. The indication comprises a network address on which the DNS service can be reached for a DNS query.

Providing the computer program product provides the advantage that the above described method can be executed on a programmable subscriber's multimedia device in the form of a computer program product, such as a software application. The computer program product can be stored on a data carrier, or be provided over carrier waves such as the internet.

BRIEF DESCRIPTION OF THE DRAWINGS

The invention will now be further elucidated by means of non-limiting examples referring to the drawings, in which.

In the Figures like reference numerals refer to like entities or processes.

DETAILED DESCRIPTION

It is observed that in the prior art it is generally not possible to request the execution of an Internet Protocol (IP) service of a subscriber's multimedia terminal, such as an IP Multimedia Subsystem (IMS) terminal, outside the context of an existing IP communication session (e.g. voice call), other than Session Initiation Protocol (SIP) based services.

The SIP terminal deposits its contact address, an IP address, at a registrar. In an IMS network this registrar is a Serving Call Session Control function (S-CSCF) entity. This contact address is used for establishing a SIP session with the SIP terminal. The terminal hence acts as a SIP server, in the sense that it can receive an initial SIP transaction. Receiving an initial SIP transaction constitutes a request for the execution of an IP service application, such as establishing a communication session or accepting an Instant message.

Besides the above-described SIP services, it is not possible to establish an IP service towards an IMS terminal outside the context of an existing SIP communication session. Besides SIP based communication services, there is no general mechanism for a subscriber's multimedia terminal, such as the IMS terminal, to offer IP based services such as a hypertext transfer protocol (HTTP) service, a Mail service, or a File Transfer Protocol (FTP) service.

Figure 1:
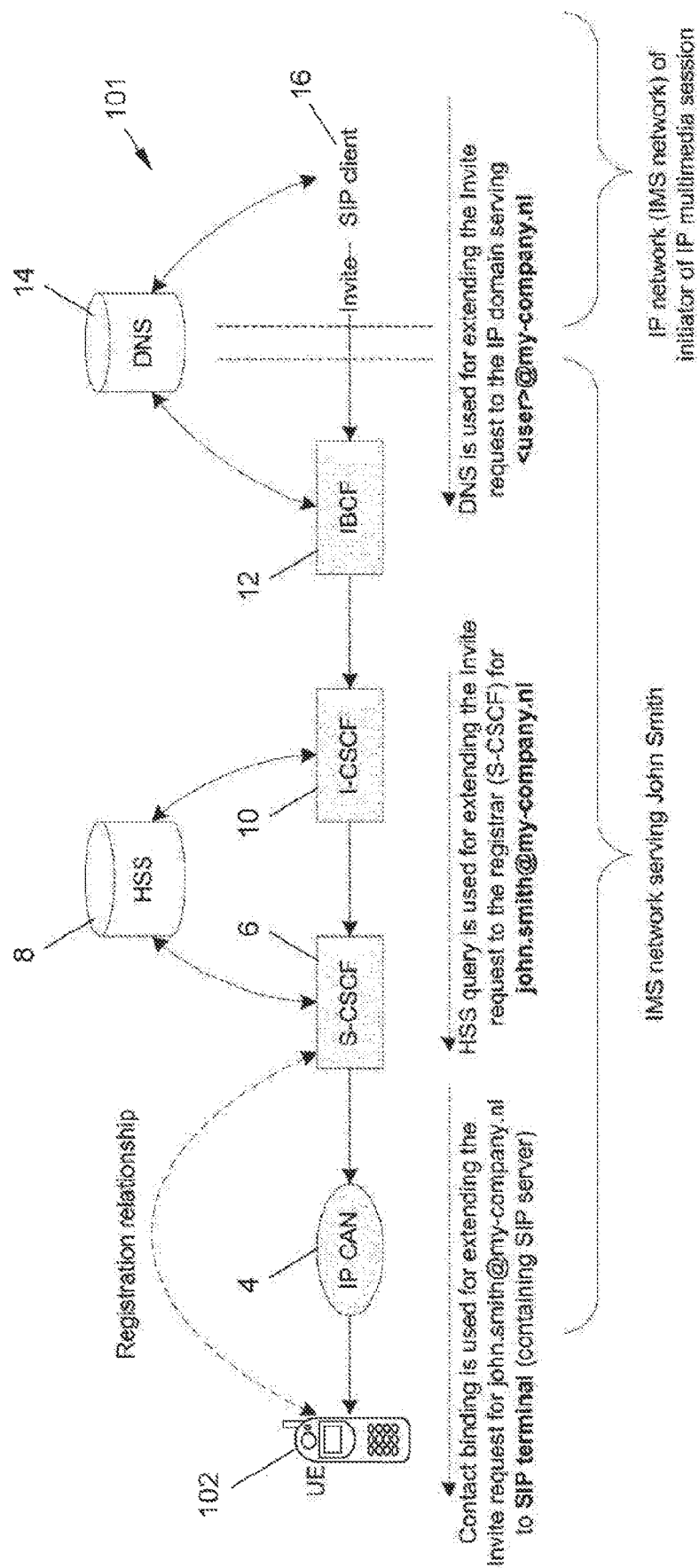
FIG. 1 is schematic representation of a part of a prior art IP network.

FIG. 1 shows an example of a prior art IMS network 101. The network contains a User Equipment (UE) 102 associated with an IMS subscriber with public user identity sip:john.smith@my-company.nl. The subscriber John Smith is an enterprise subscriber, associated with the enterprise 'My Company', the domain name of which is 'my-company.nl'.

The network 101 in FIG. 1 further includes an IP Connectivity Access Network (IP-CAN) 4, a registrar 6, here an S-CSCF entity 6, a Home Subscriber Server (HSS) 8, an Interrogating Call Session Control Function (I-CSCF) entity 10, an Interconnect Border Control Function (IBCF) entity 12, and a Domain Name System (DNS) server 14. The subscriber John Smith is registered with the IMS network 101 as IMS subscriber, through a SIP terminal formed by the UE 102. Hence the IMS subscriber's terminal 102 executes a SIP service application, i.e. the subscriber's terminal 102 acts as a SIP server.

Figure 2:
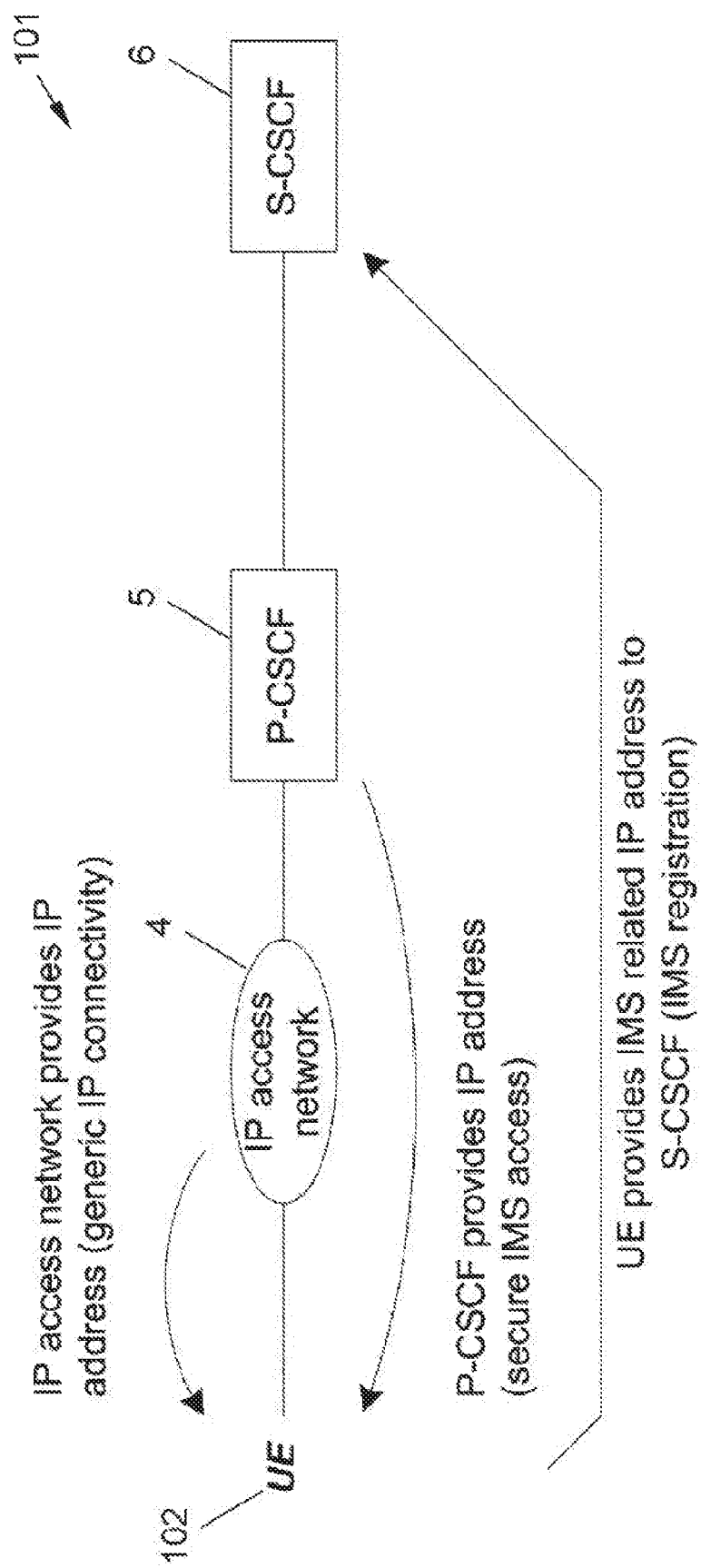
FIG. 2 is a schematic representation of a part of a prior art IP network.
Figure 3:
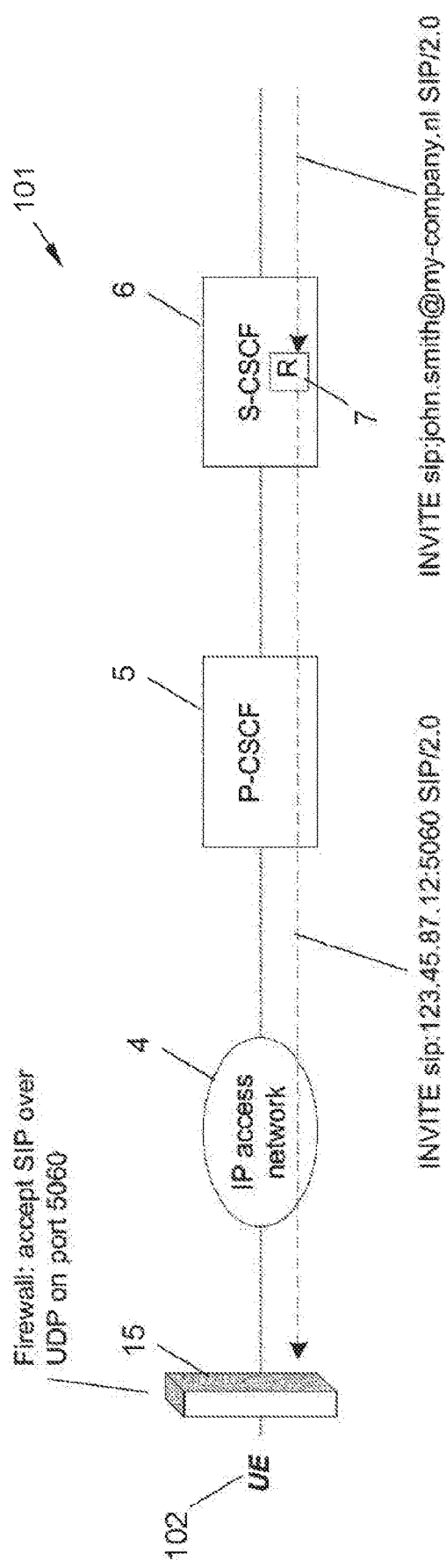
FIG. 3 is a schematic representation of a part of a prior art IP network.

When the subscriber's IMS terminal 102 registers in the IMS network 101, it deposits its SIP binding in the registrar 6, i.e. in an S-CSCF entity 6 of the IMS network 101 the subscriber belongs to, as shown in FIG. 2. A P-CSCF entity 5 forms part of the visited IMS network. The S-CSCF entity 6 forms part of the home IMS network. The I-CSCF entity 10 and HSS 8 are not shown in FIG. 2 but can be seen in FIG. 1. Once the IP address of the subscriber's terminal 102 has been deposited in the S-CSCF entity 6, the terminal 102 is ready to receive requests for SIP services. By virtue of being able to receive and process SIP requests (on its published IP address and port number), the terminal 102 has the role of a SIP server. This is depicted in FIG. 3. Again, the I-CSCF entity 10 and HSS 8 are not shown (refer to FIG. 1).

The 'R' in FIG. 3 represents the registrar functionality 7 in the S-CSCF entity 6. FIG. 1 shows a SIP client 16 associated with a second subscriber (other party). For sending an initial SIP request to the subscriber's terminal 102, the subscriber's public identity is used. The SIP client 16 does not need to have any knowledge about the access network currently in use by the subscriber's terminal 102 and the IP address of the terminal 102.

When requesting a SIP service from the terminal 102 the user from whom the SIP service is requested is identified as: sip:john.smith@my-company.nl. The public user identifier for SIP services has the form of a Universal resource identifier (URI). The following address components are identified. The schema 'sip:' indicates that a SIP service is requested. The protocol to route the request to the destination party shall be SIP. The domain 'my-company.nl' is used to derive the IMS network (e.g. ims.provider.nl) that is serving the user from whom the SIP service is requested. This allows for routing the SIP service request towards said IMS network service user, in accordance with DNS services and SIP routing methodology. The user part 'john.smith' in combination with the domain identifies the particular user served by the IMS network (which was derived from the domain). Within the IMS network, the SIP service request is forwarded to the registrar (S-CSCF) 6 that is currently assigned to this user (e.g. s-cscf1.ims.provider.nl). When the SIP request has been forwarded to the registrar 6, it can be forwarded further towards the user's terminal(s), based on contact address information contained in the registrar (e.g. sip: 173.68.81.221).

When the SIP client 16 sends the SIP request to the IMS subscriber associated with UE 102, a three-step forwarding of the SIP request is specific for SIP services. It facilitates the establishment of a SIP service towards the IMS subscriber's terminal 102. Each step of the three-step forwarding is based on a database containing static or dynamic data. Three relationships are used for extending an initial request for the establishment of a multimedia communication session (e.g. an Invite), or a non-session related request (e.g. a Message), to the terminal 102 currently in use by the subscriber. Firstly, a DNS query with the DNS server 14 is used for extending the Invite from the SIP client 16 initiating the SIP session, towards the IMS network serving any subscriber (<user>@my-company.nl) within the domain my-company.nl. DNS constitutes the global DNS infrastructure and encompasses both external DNS and internal DNS. This DNS based routing of the Invite is based on static DNS configuration. Secondly, within the IMS network serving the subscriber(s)<user>@my-company.nl, an HSS 8 query by the I-CSCF entity 10 is used for extending the Invite to the registrar, S-CSCF, 6 currently serving the subscriber john.smith@my-company.nl. The data used for this extending is dynamic data, contained in the HSS 8 and is updated when the subscriber de-registers or when another S-CSCF entity 6 is assigned to the subscriber john.smith@my-company.nl. Thirdly, from the S-CSCF entity 6, a SIP contact binding is used for extending the Invite for the subscriber john.smith@my-company.nl to one or more of the terminals 102 currently registered by the subscriber John Smith. This contact binding information is dynamic; it is updated when, for example, the terminal 102 changes IP access.

The subscriber John Smith is now ready to receive SIP session establishment requests (e.g. a SIP Invite) or non-session related SIP transaction requests (e.g. a SIP Message), as described.

The inventor has realised that the subscriber, in addition to the possibilities provided in the prior art network 101, would benefit from the possibility to offer additional IP services from his multimedia terminal, which IP services are accessible to third parties. The inventor has realised that the subscriber e.g. wants to offer a (restricted) publicly available hypertext transfer protocol (HTTP) service from his mobile or fixed terminal. Such HTTP service could be accessible through the Uniform Resource Locator (URL) john.smith.my-company.nl. The inventor also realised that as another example, the subscriber would like to offer a File Transfer Protocol (FTP) service from his terminal. This FTP service could also be accessible through the URL john.smith.my-company.nl. Moreover, the inventor realised that the subscriber would also benefit from the possibility to offer these services from non-human operated devices. In the following examples is referred to a subscriber's multimedia device. Such subscriber's multimedia device can be a human-operated device or a non-human operated device. The subscriber's multimedia device can for instance be a subscriber's multimedia terminal or a subscriber's device in a machine-to-machine communication situation.

Figure 4:
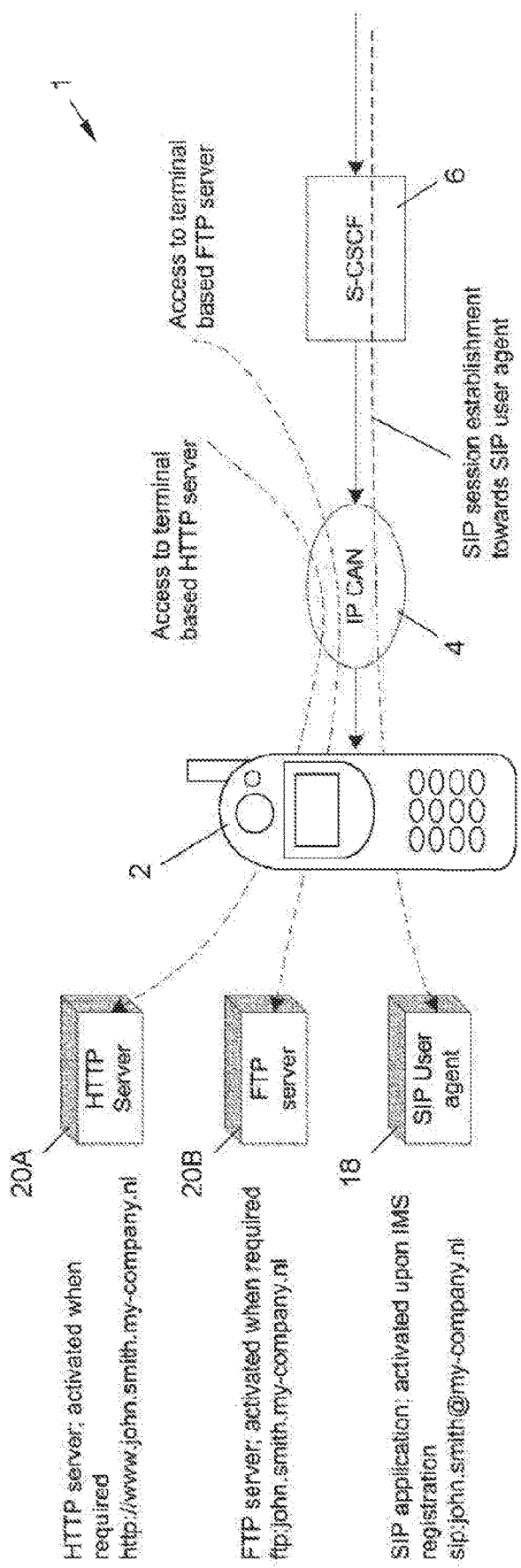
FIG. 4 is a schematic representation of a part of an IP network.
Figure 5:
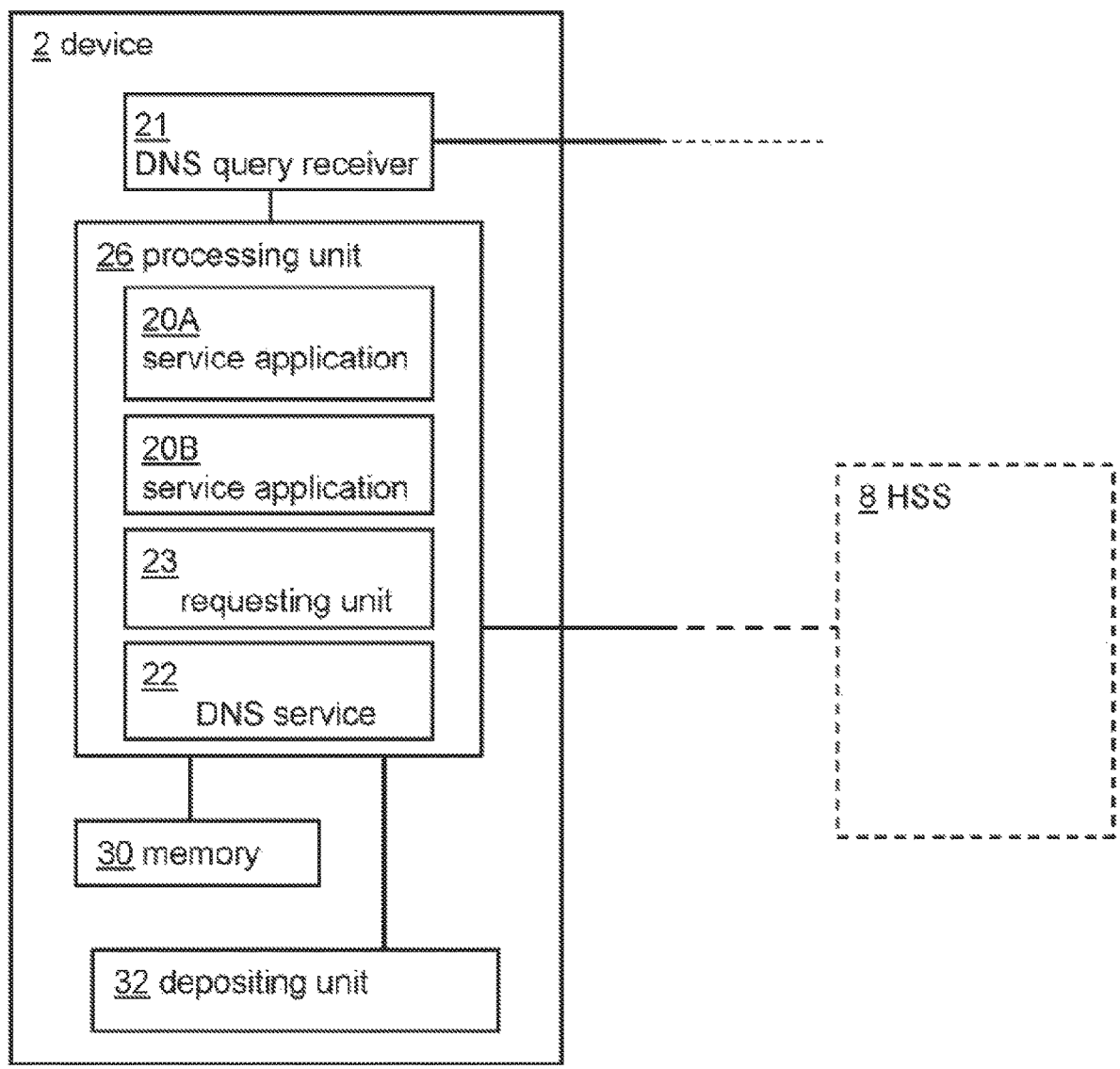
FIG. 5 is a schematic representation of a multimedia device.
Figure 6:
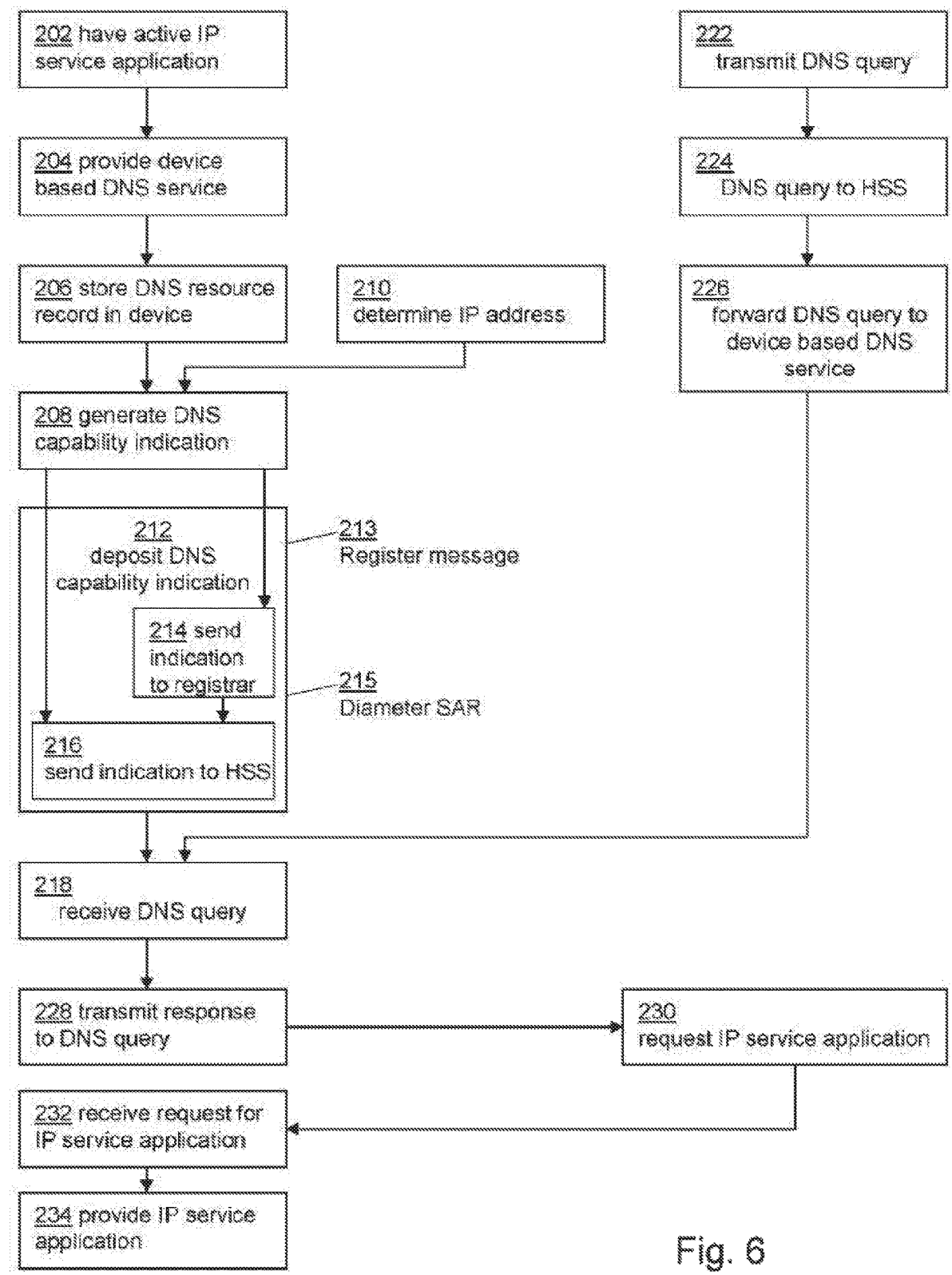
FIG. 6 is a flow chart representing a process.

FIG. 4 shows an example of a part of an IP multimedia network 1 according to the invention. The network 1 includes a subscriber's multimedia device 2. It will be appreciated that the IP multimedia network 1 is similar to the prior art multimedia network 101 shown in FIG. 1, the main difference being in the functionality of the multimedia device 2 and terminal 102. Reference is also made to FIG. 5 which shows a schematic representation of the multimedia device 2, and to FIG. 6 which shows a flow chart which includes steps of the working of the network 1 as explained with respect to FIG. 4.

The subscriber has three IP service applications active 202 and operational on his (mobile) multimedia device 2. The first IP service application is a SIP user agent 18, which is used for establishing and receiving SIP sessions or SIP stand-alone requests. This SIP user agent 18 is activated upon IMS registration. This SIP user agent 18 is accessed through the IMS network, e.g. via a P-CSCF entity and an S-CSCF as is known in the art. The second IP service application is an FTP service application 20B, which can be activated any time when needed. This FTP service application 20B is accessed through the IP access network 4 used by the subscriber associated with the multimedia device 2. The third IP service application is an HTTP service application 20A, which can be activated any time when needed. This HTTP service application 20A is accessed through the IP access network 4 used by the subscriber associated with the multimedia device 2.

It is conceivable that, in line with the prior art, the domain john.smith.my-company.nl associated with the subscriber John Smith is contained in DNS. The (public) DNS name server 14 authoritative for this domain is then configured with DNS resource records that are needed (i.e. need to be obtained by the DNS resolver in the IP service client 16) for accessing IP service applications in the subscriber's IMS device 2. The problem with such static configuration is that such DNS name server 14 configuration is static, whereas the IP address of the device 2 of the subscriber is dynamic. Further, the subscriber can have one or multiple IP service applications deployed on his multimedia device 2. The subscriber can activate and de-activate the IP service applications on his device 2 as and when required. Such flexible activation and de-activation cannot be configured in a (static) DNS name server 14. Further, the subscriber should have the possibility to add IP service applications to his device 2 or remove IP service applications from his device 2. Such flexible adding and removing of IP service applications cannot be configured in a (static) DNS name server 14. Here it is noted that IETF RFC 2136, Dynamic Updates in the Domain Name System (DNS UPDATE), describes how a (public) DNS server can be updated. Specifically, IETF RFC 2136 specifies a protocol by means of which an entity can update DNS Resource Records in a DNS server. The update of these Resource Records is static. This confirms the problems that are mentioned above, namely that the subscriber has to frequently update the (public) DNS server. Such update is required every time the subscriber acquires a new IP address for the device 2, every time the subscriber activates or de-activates an IP service application on his device 2, and every time the subscriber adds or removes an IP service application on his device 2.

These problems are solved by providing 204 a DNS service 22 that is executed on the device 2. DNS queries for the domain related to the subscriber, i.e. the domain john.smith.my-company.nl, are forwarded 222, 224, 226 to the subscriber's device 2. The subscriber's device 2 is arranged to execute thereon a DNS service 22 relating to the domain associated with the subscriber. The subscriber's device 2 also stores 206 information relating to DNS resource records needed for accessing the IP service applications 20A, 20B that are being executed on the device 2 at that moment.

Hence, it is the subscriber's multimedia device 2 that executes 204 the DNS service 22, i.e. the device 2 takes the role of DNS server 22' for the domain related to the user of that device 2. Since it is the subscriber's multimedia device 2 where IP service applications 20A. 20B are dynamically installed and removed, activated and de-activated, with an IP address(es) that will differ over time, it is the device 2 that is best equipped to provide information about available IP service applications 20A, 20B on that device 2.

Above, the registration of the terminal 102 with the IMS network 101 has been described with reference to FIG. 2. This registration is also performed by the device 2 for registering with the IMS network 1.

Figure 7:
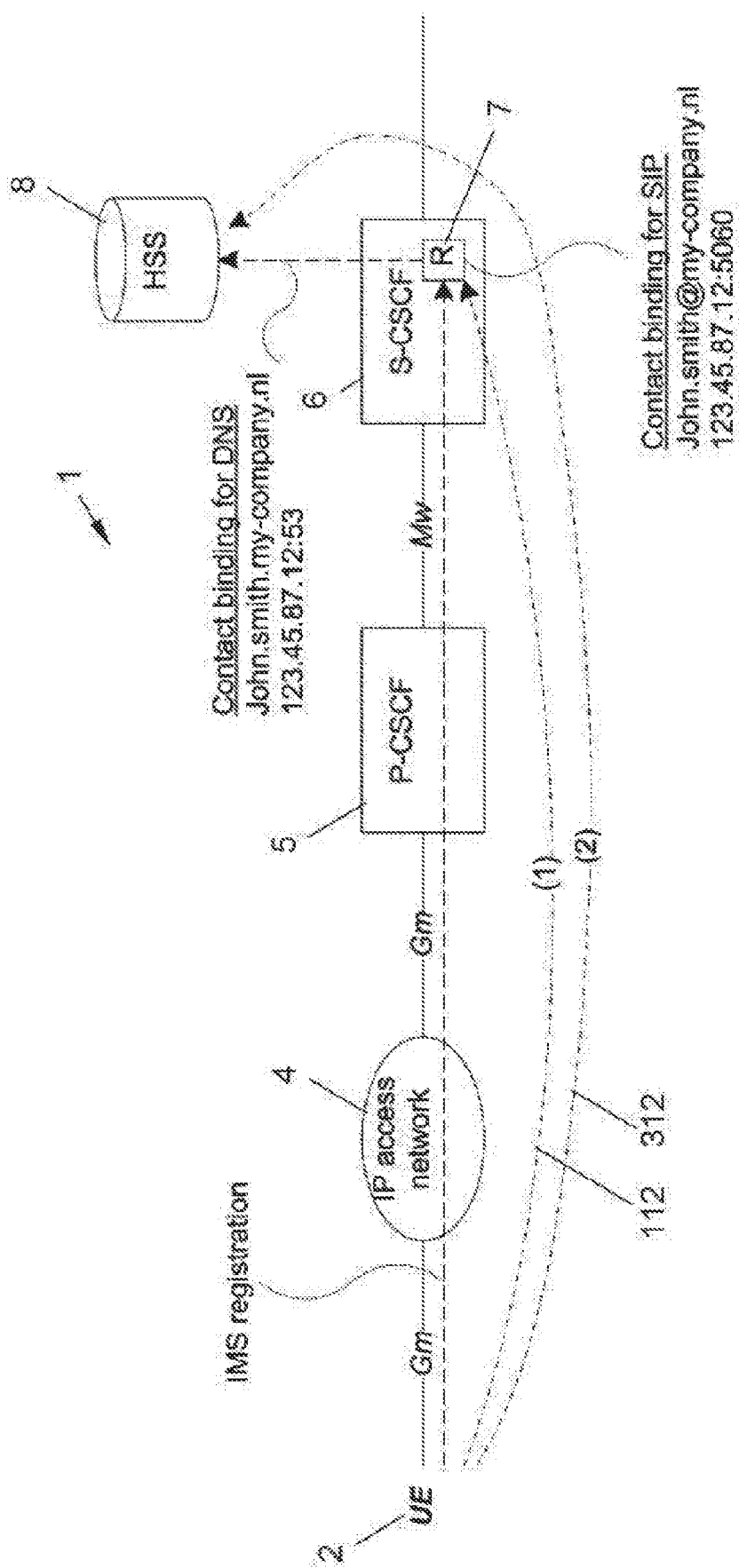
FIG. 7 is a schematic representation of a part of an IP network.

The device 2 will during registration also deposit 212 an indication of its capability to execute the DNS service. In line with the principle of depositing a contact binding in the S-CSCF entity 6 for SIP services, the device 2 deposits a 'DNS Server binding' in the IMS network 1. This is depicted in FIG. 7. The contact binding for SIP services is deposited in the S-CSCF entity 6 in accordance with IMS specification, which is therefore not further described. The dashed line 112 symbolizes the depositing of the contact address for SIP services for this public user identity into the registrar 6. The dashed line 312 symbolizes the depositing of the contact address for DNS services for this public user identity, into HSS 8.

An indication of the device's capability to execute the DNS service is included in the (protected) SIP Register message 213 and is deposited in HSS 8. This indication is included in the Diameter server assignment request, SAR, 215 sent 216 from the S-CSCF 6 to the HSS 8. Diameter SAR can, according to the IMS standard, carry a copy of the complete SIP Register message, including this indication of the device's capability to execute the DNS service. The validity, over time, of this indication is aligned with the IMS registration of the device 2. When the IMS registration of this device 2 expires or when the device de-registers, the indication of the device's capability to execute the DNS service is purged. Hence, the HSS 8 received an indication of the device's capability to execute the DNS service. The HSS 8 does not (have to) have knowledge about actual IP service applications 20A. 20B active on the device 2. The indication includes the network address for the DNS service 22 executed on the device 2. Hence, the HSS 8 stores the network address for the DNS service executed 22 on the device 2.

The indication of the device's capability to execute the DNS service that the device 2 provides to the HSS 8 includes an IP address on which the DNS service 22 executed on this multimedia device 2 can be reached for a native DNS query. This IP address can be the IP address that the device 2 had received during IMS registration for secure access to the IMS network. This IP address for secure access to the IMS network is an IP address on the P-CSCF 5. Hence, the DNS query towards the device 2 will be routed through the P-CSCF 5, which will forward the DNS query, over the secure connection, to the device 2.

In order to allow the P-CSCF 5 to forward the DNS query towards the subscriber's device 2, the P-CSCF 5 needs to be able to associate a DNS query with a particular registered subscriber. Therefore, when the IMS registration from the subscriber contains an indication of the device's capability to execute the DNS service, the P-CSCF 5 stores that indication in the subscriber profile of the subscriber. The indication includes the network address for the DNS service executed on the device 2. Hence, the P-CSCF entity stores the address for the DNS service executed on the device 2 upon registration of the device 2. This enables the P-CSCF 5 to forward a DNS query for the domain associated with the subscriber to the appropriate registered IMS device 2.

Alternatively, the device 2 can use the IP address related to the IP access network 4. In that case, the DNS query towards the device 2 will not traverse the secure IMS connection.

The domain for which the device 2 indicates that it is authoritative shall be a domain that is associated with ('owned by') the user of this device 2. A domain name of this domain can be composed of the user part and domain part of one of the subscriber's IMS public user identities. IMPU, in the Implicit registration set (IRS) for this device 2. For the subscriber sip:john.smith@my-company.nl, the domain for DNS services in this example is set to john.smith.my-company.nl. The public user identifier for DNS services has the form of a domain. In this example, the following address components are identified. The 'my-company.nl' fields of the domain lead to forwarding the DNS service request to the IMS network serving users of the domain my-company.nl, in a manner comparable with forwarding a SIP service request to that IMS network. The fields 'john.smith' together with the domain fields that were used for forwarding the DNS service request to the IMS network serving users of the domain my-company.nl (in other words, the complete domain john.smith.my-company.nl), are used to identify the sub-domain associated with the user from whom a DNS service is requested. The DNS service request can be forwarded to the sub-domain, using the DNS contact address that was deposited in the HSS 8. The adherence to this rule may be enforced by the HSS 8.

FIG. 5 shows an example of a subscriber's multimedia device 2. The device 2 includes a processing unit 26. The processing unit 26 is arranged for executing at least one IP service application 20A, 20B. The processing unit 26 further includes a requesting unit 23 arranged for determining information relating to the at least one IP service application (20A. 20B) that is being executed on the device 2. The requesting unit can request the Operating System, OS, of the device 2 for information relating to the at least one IP service application 20A, 20B. The information relating to the at least one IP service application 20A, 20B in this example includes a network address at which the at least one IP service application 20A, 20B is accessible. The device 2 further includes a DNS query receiver 21 for receiving a DNS query relating to the domain associated with the subscriber associated with the device 2. The processing unit 26 is further arranged for executing the DNS service 22 relating to the domain associated with the subscriber. The device 2 includes a memory 30. The memory 30 stores 206 the information relating to the DNS resource records. The device 2 further includes a depositing unit 32 which will be explained below. It will be appreciated that the DNS service 22 executed 204 in the processing unit 26 can, alternatively, also be provided by a DNS server 22', i.e. a dedicated hardware unit, provided in the device 2. In the latter case, the memory 30 can form part of the DNS server 22'.

The memory 30 contains DNS resource records in accordance with the IP service applications offered by the device 2 at that moment. These DNS resource records will typically comprise Naming Authority Pointer (NAPTR) records, Service (SRV) records and A records. Instead of A records (for IP version 4, IPv4, addressing), AAAA records (for IP version 6, IPv6, addressing) can be used. Where herein is referred to A records, this is to be understood as referring to A records or AAAA records, so far as appropriate, unless otherwise indicated.

In this example, the processing unit 26 of the subscriber's device 2 is executing 202 the HTTP service application 20A, on the domain john.smith.my-company.nl. A third party 16 wants to access this HTTP service application 20A. Thereto, the third party 16 transmits 222 a DNS query for that address. The DNS query is routed, by means of standard DNS iterative query forwarding to the authoritative DNS name server 14 for the domain my-company.nl (just as a request for a SIP server for that domain would be forwarded to that authoritative name server). This authoritative DNS name server 14 is configured such that all DNS queries destined for sub-domains. i.e. *.my-company.nl, associated with subscribers within the domain are forwarded 224 to the HSS 8 of the IMS operator that is serving users of the domain my-company.nl. That HSS 8 is then acting as authoritative name server for the sub-domains *.my-company.nl. The HSS 8 acts as authoritative name server for a domain including a plurality of sub-domains, each sub-domain being associated with a subscriber's public address, each subscriber being associated with a subscriber 2. The HSS 8 stores the indication of the multimedia device's capability to execute the DNS service 22.

It will be appreciated that it is possible that the public domain used for the IP service applications on the subscriber John Smith' device contains an additional, unique field associated with the IMS operator serving the subscriber, e.g. john.smith.mobile.my-company.nl. The fields mobile.my-company.nl can then point to a DNS server in the IMS network serving the domain my-company.nl. It will be appreciated that embodiments of the present invention exist which do not comply with the above described name structure for the sub-domain formed by the subscriber's device 2.

Figure 8:
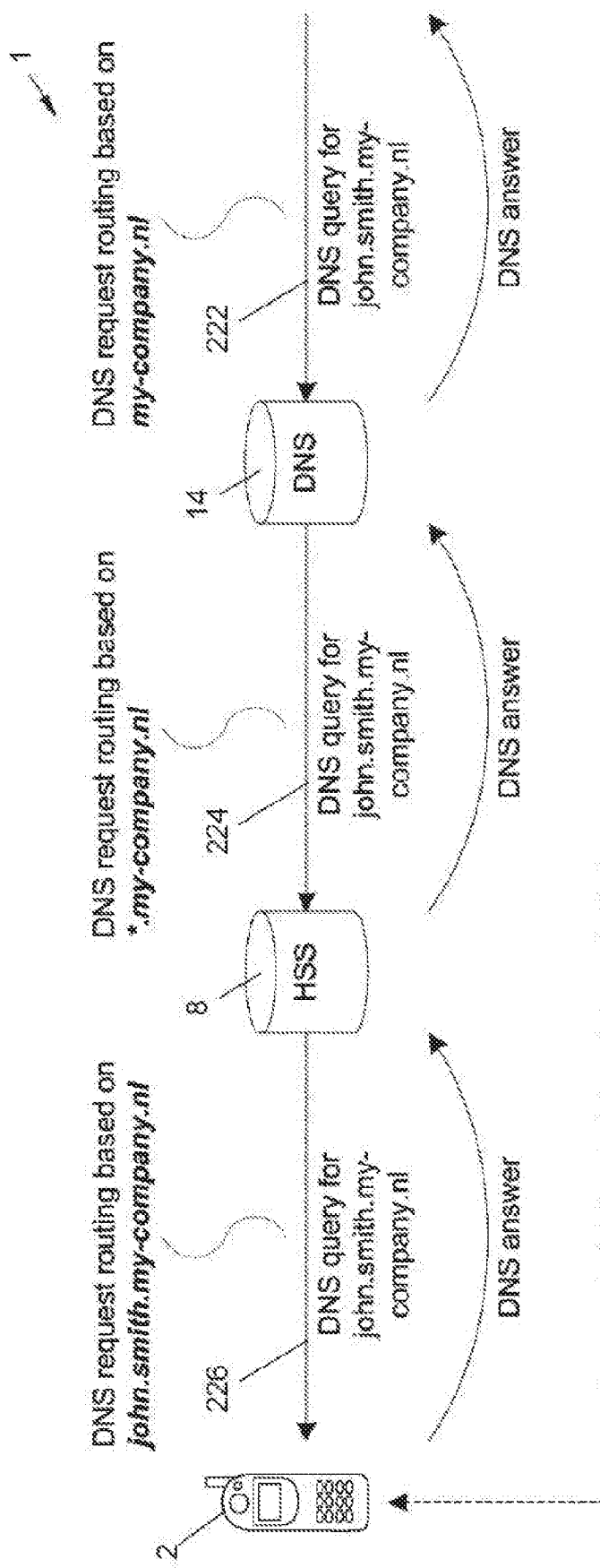
FIG. 8 is a schematic representation of a part of an IP network.

When requesting an IP service application 20A, 20B from the device 2 a DNS query for the sub-domain john.smith.my-company.nl is forwarded 222, 224, 226. e.g. through native DNS iterative DNS query forwarding, towards the device currently in use by the subscriber John.Smith@my-company.nl. This is shown in FIG. 8. The network 1 does not need to have information about IP service applications that are active in the device 2 in use by the subscriber John.Smith@my-company.nl. The network 1 only has to forward the DNS query to this device 2, using the contact address (e.g. IP address) on which that device 2 is currently contactable for DNS queries.

This forwarding of the DNS query is performed as follows. The HSS 8, having received the DNS query for the sub-domain john.smith.my-company.nl, has to forward this DNS query towards the device 2 of the subscriber John Smith, using the indication of the device's capability to execute the DNS service that the subscriber John Smith had provided to the HSS 8 during registration. The HSS 8 can be deployed according to Data layered architecture, DLA. The DNS query can be received in a HSS-DNS front-end, which forwards the DNS query to a Centralized user database, CUDB, which contains subscriber data. The CUDB has an internal database to forward the DNS query to the correct application within the CUDB and to associate the DNS query with the subscriber's data. The subscriber is identified in the DNS query (john.smith.my-company.nl). Hence, this shall be a valid search criterion for the CUDB data (just as sip:john.smith@my-company.nl is a valid search criterion for the CUDB data).

The subscriber record in the HSS 8 for the subscriber john.smith@my-company.nl contains an indication relating to the DNS service 26 being executed on the subscriber's device 2. The indication comprises a network address on which DNS service being executed on the device 2 can be reached for a DNS query. Hence, The HSS 8 can forward the DNS query to the subscriber's device 2. The IP address for the DNS service 26 being executed on the subscriber's device 2 is an IP address at the P-CSCF 5 (as described, to utilize the secure IMS access) or at the Access Network 4 (as described, for access outside the secure IMS connection). So, the DNS query is forwarded to the P-CSCF 5 through which the subscriber John Smith is registered with the IMS network 1, or to the access network 4 utilized by the device 2. If P-CSCF IP address is used as IP address for DNS queries, then the P-CSCF 5 had stored the DNS service address indication from the subscriber, during registration, so is able to forward this DNS request to the subscriber's device 2.

When the S-CSCF 6 sends a SIP request to the device 2, it addresses the device 2 with the device contact address and uses the Path header, received from the P-CSCF 5 during registration, to let the SIP request traverse the P-CSCF 5 (using the Path header as Route header). Such mechanism is not available for forwarding the DNS query. Therefore, the DNS query for the sub-domain john.smith.my-company.nl is sent to the P-CSCF 5, on port 53. The P-CSCF 5 forwards the DNS query to the device 2 associated with the sub-domain john.smith.my-company.nl. Hence, in general, the DNS query can be forwarded to a network address that corresponds to the IP address that the Multimedia device 2 had received during IMS registration. The address on which the device based DNS service 22 is reachable will generally not be identical to the IP address that the device 2 has received during registration, since the port number, which forms part of the address, will be different.

Figure 9:
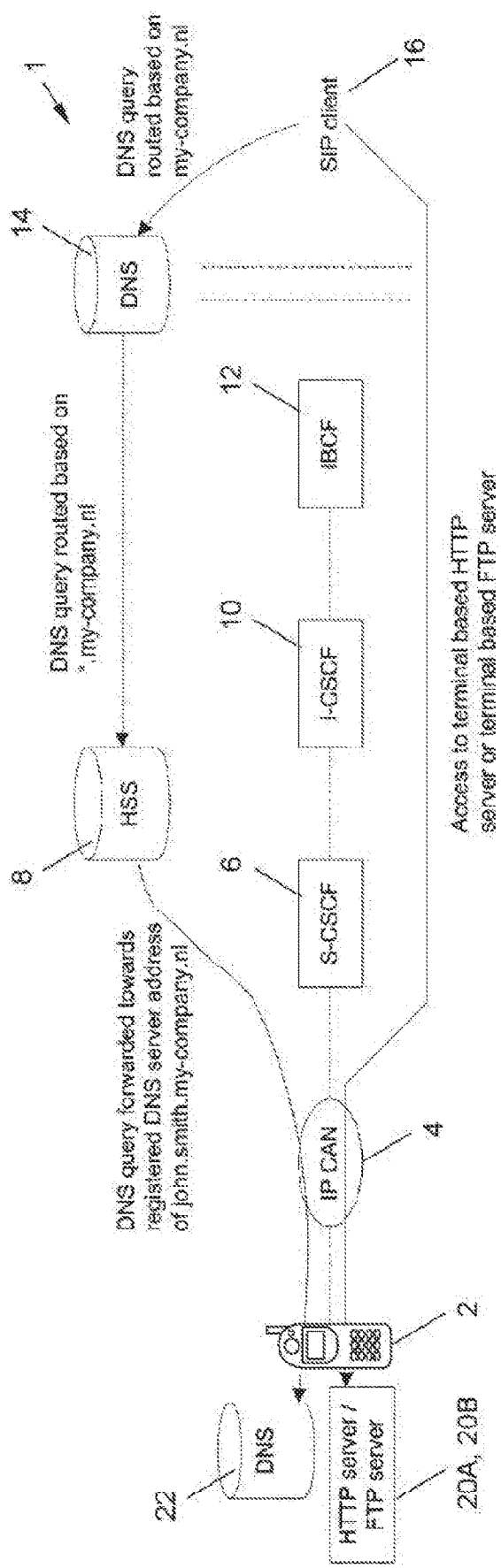
FIG. 9 is a schematic representation of a part of an IP network.

The subscriber's device 2 receives the DNS query (on port 53). The processing unit 26 of the device 2 executes the DNS service 22, as explained above. The device based DNS service 22 is authoritative for the sub-domain john.smith.my-company.nl associated with the subscriber associated with the device 2. This device based DNS service 22 contains DNS resource records in accordance with the IP service applications that are active in the device 2 at that moment. For example, if the user had activated the HTTP service 20A in the device 2, then the respective service application 20A would have placed a corresponding A record in the device based DNS service 22, said A record containing information that is needed for accessing the HTTP service 20A in the device 2. Placing the corresponding A record in the device based DNS service 22 can include storing the A record in memory 30. Specifically, this A record will contain the IP address on which this HTTP service 20A is accessible. Refer to FIG. 9. Generally, the response to the DNS query can include a network address where the requested IP service application executed on the device 2 can be accessed.

The response to the DNS query is sent 228 towards the party 16 that originated the query. The sending 228 of the response towards the party 16 is done in accordance with standard DNS message addressing and routing technique. This embodiment allows for a service access authorization utility on the IMS subscriber's device 2. The subscriber can, through the DNS service 22 on the device 2, control which requesting parties 16 gain access to this subscriber's IP service applications 20A. 20B.

The IP address that the device 2 provides in the A record can be the IP address of the IP access network 4. In that case, access to the HTTP service 20A in the device 2 does not traverse the secure IP access via the P-CSCF 5. It is advantageous to have the device 2 provide, in the A record, the IP address of the IP access network 4, since that is publicly accessible. If the device 2 would provide, in the A record, the IP address that the device 2 had obtained from the P-CSCF 5, in the network 1, then the IP session would need to be established through the IMS network 1.

If the DNS query sent 222, 224, 226 to the device 2 was for a NAPTR record, then the NAPTR record that is returned 228 in response to the query contains an instruction to apply an SRV record query. The domain to be used for the SRV record query shall be a domain pointing to the same device 2 based DNS service 22. Likewise, an SRV query towards the device based DNS service 22 shall result in an instruction to apply an A record query. The domain to be used for the A record query shall be a domain pointing to the same device based DNS service 26. An A record query towards the device based DNS service 22 shall return an IPv4 address. An AAAA record query towards the device based DNS service 22 shall return an IPv6 address.

If the device 2 has, at the moment of receiving the DNS query, no IP service application active and operational, then there will not be a corresponding DNS record for such service application. Hence, the device 2 applies regular DNS response method to indicate that the requested DNS record does not exist.

The Time-to-live, TTL, of the DNS resource records returned by the device based DNS service 22 should be set appropriately (by the device application that sets these respective resource records). A mobile device, for example, would typically use a short TTL value.

When the response to the DNS query reaches the party 16 that originated the query, This party 16 determines from the response the network address at which the requested IP service application 20A, 20B is to be accessed. The party 16 then sends 230 a request for the IP service application 20A. 20B to the device 2. Upon receiving 232 the latter request, the subscriber's multimedia device 2 provides the requested IP service to the party 16.

Figure 10:
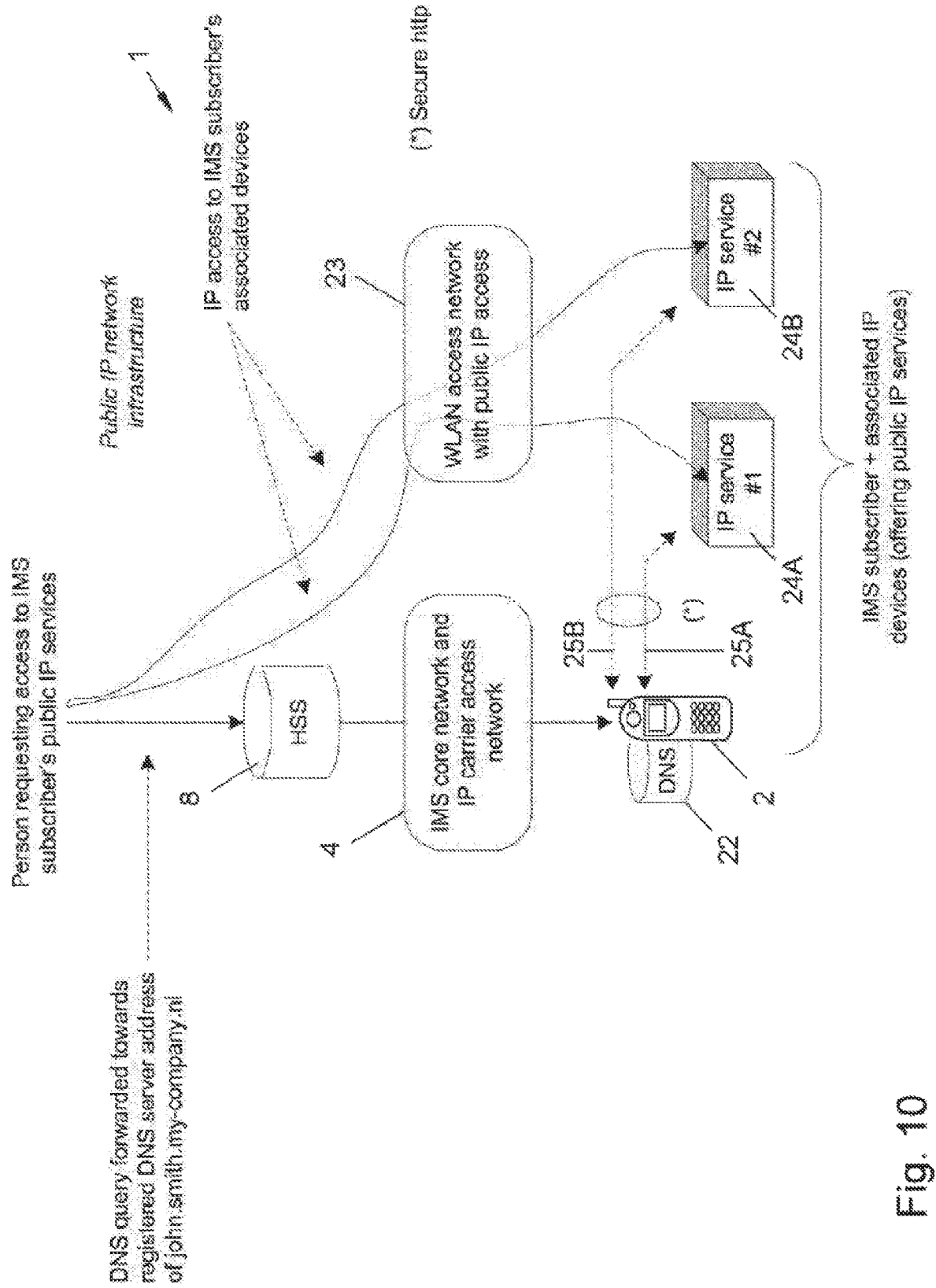
FIG. 10 is a schematic representation of a part of an IP network.

In an embodiment the device 2 based DNS service 22 is used to grant, by an IMS network subscriber, access to that subscriber's one or more auxiliary devices 24A. 24B. This is depicted in FIG. 10. The IMS subscriber has a plurality of IP service applications available, being executed on the plurality of auxiliary devices 24A. 24B that are under administrative control if this IMS subscriber. These auxiliary devices 24A. 24B can be additional multimedia devices, e.g. multimedia terminals. These devices 24A, 24B can also be other devices, e.g. dedicated devices for executing IP service applications. These devices 24A, 24B are arranged for executing IP service applications 20A. 20B, such as an HTTP service or an FTP service.

Figure 11:
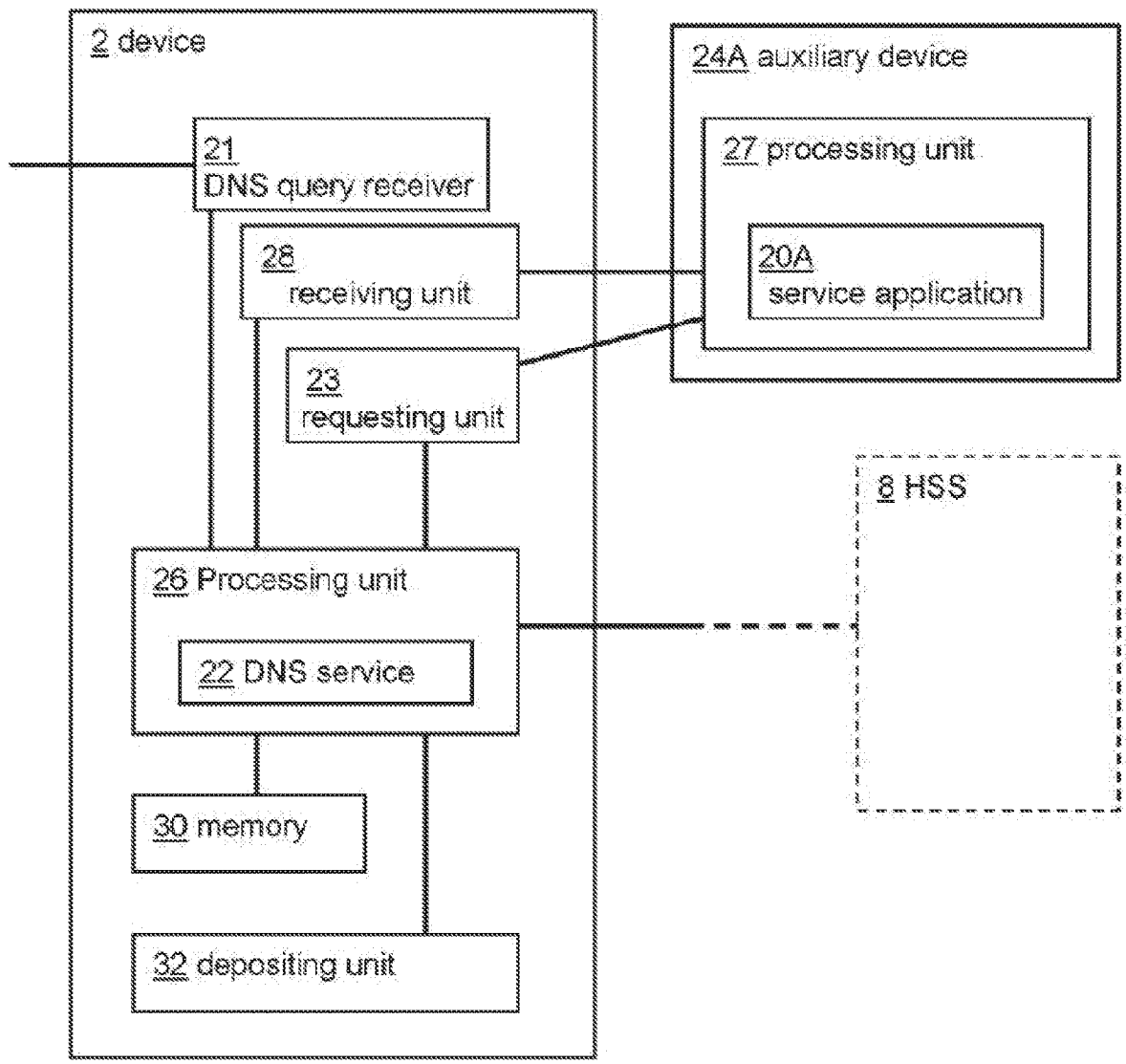
FIG. 11 is a schematic representation of a combination of a device and an auxiliary device.

FIG. 11 shows a schematic representation of a device 2 and a device 24A (device 24B being essentially identical). The subscriber's multimedia device 2 includes the processing unit 26 arranged for executing the DNS service 22 relating to the domain associated with the subscriber, including the devices 24A and 24B. The device 2 further includes the DNS query receiver 21, the requesting unit 23, the memory 30 and the depositing unit 32 as described with respect to FIG. 5. In this embodiment, the requesting unit 23 is arranged for requesting (e.g. from the Operating System, OS) the device 24A for information relating to the at least one IP service application 20A, 20B. The information relating to the at least one IP service application 20A. 20B in this example includes a network address at which the at least one IP service application 20A, 20B is accessible. It will be appreciated that the DNS service 22 executed 204 in the processing unit 26 can, alternatively, also be provided by a DNS server 22', i.e. a dedicated hardware unit, provided in the device 2. In the latter case, the memory 30 can form part of the DNS server 22'.

The device 24A includes a processing unit 27 arranged for executing one or more IP service applications 20A. The processing unit is also arranged for gathering information relating to the at least one IP service application that is being executed on the device 24A and for providing this information to the device 2.

The device 2 further includes a receiving unit 28 arranged for obtaining from the device 24A information relating to the at least one IP service application that is being executed on the device 24A. The secure HTTP connection 25A, 25B between the device 2 and the devices 24A. 24B is used by the device 2 to obtain information about the active and operational IP service applications in these devices 24A, 24B, so it can configure the device based DNS service 22 accordingly. The processing unit 26 of the device 2 is thereto arranged for, using this information, generating DNS resource records in accordance with the IP service applications 20A offered by the devices 24A, 24B at that moment. The DNS resource records are stored in the memory 30. These DNS resource records will typically comprise NAPTR records. SRV records and/or A or AAAA records.

Referring again to FIG. 10, access to each of the IP service applications 20A. 20B on the devices 24A, 24B can be obtained through a DNS query towards the DNS service 22 being executed on this IMS subscriber's device 2. Here this device 2 is an IMS device, e.g. an IMS terminal. Access to this device based DNS service 22 takes place as described above. Hence, the IP service application 20A. 20B on the device 24A, 24B is accessible by means of addressing information obtained from the DNS service 22 executed on the multimedia device 2, and the device 2 obtains information about IP service applications being executed in the device 24A, 24B, so as to configure the DNS service 22 executed on the Multimedia device 2 accordingly.

The device 2 is arranged for establishing, maintaining and terminating a secure HTTP connection with the devices 24A, 24B. The DNS service 22 executed on the multimedia device 2 maintains a secure HTTP connection 25A, 25B with the subscriber's associated other devices 24A, 24B. This secure HTTP connection 25A, 25B is used to grant access to a designated IP service application(s) on these other devices 24A, 24B, said access being granted to another party (entity) 16 requesting such access. The IP service application 20A, 20B on the device 24A, 24B is accessible for the requesting party 16 by means of addressing information obtained from the DNS service 22. The DNS response to this other party 16 contains the IP address of such designated IP service application on such other (associated) device 24A, 24B. This embodiment allows for a service access authorization utility on the IMS subscriber's device 2. The subscriber can, through the DNS service 22 on the device 2, control which requesting parties 16 gain access to this subscriber's IP service applications 20A, 20B.

For example, the IP service application 20A, 20B being executed on such other (associated) device 24A, 24B provides access only to entities 16 that are using the same sender's IP address for the access to said IP service, as was used for the query to the DNS server.

The secure HTTP connection 25A, 25B between the subscriber's device 2 and the subscriber's associated device(s) 24A, 24B can be using WLAN connectivity from the device 2 or can be using 3G or LTE access, i.e. not using the IMS registration for said secure HTTP.

It will be appreciated that the IP service applications 20A. 20B, the DNS query receiver 21, the DNS service 22, the requesting unit 23, the processing unit 26, the processing unit 27, the receiving unit 28, and the depositing unit 32 can be embodied as dedicated electronic circuits, possibly including software code portions. The IP service applications 20A, 20B, the DNS query receiver 21, the DNS service 22, the requesting unit 23, the processing unit 26, the processing unit 27, the receiving unit 28, and the depositing unit 32 can also be embodied as software code portions executed on, and e.g. stored in, a memory of, a programmable apparatus such as a computer.

In the foregoing specification, the invention has been described with reference to specific examples of embodiments of the invention. It will, however, be evident that various modifications and changes may be made therein, without departing from the essence of the invention.

It will be appreciated that the above described method will work equally for roaming subscribers, including IP access roaming, IMS roaming and nomadic user. In IP access roaming, IMS registration runs via a P-CSCF entity in the subscriber's home network. Access to the DNS service 22 being executed on the subscriber's device 2 runs via secure IMS access, via the P-CSCF entity. The device 2 deposits the indication of its capability to execute the DNS service in the HSS, during registration. In IMS Roaming, the subscriber uses a P-CSCF entity in the visited country. The functioning of the method of the invention depends on support, by the used P-CSCF entity, of the registration of the network address for the DNS service 22 executed on the device 2. In case of a Nomadic user, the subscriber can use wireline IP access in a foreign country. The user attaches via a P-CSCF entity in the home IMS network. Registration of the network address for the DNS service 22 executed on the device 2 is done via this P-CSCF entity, as described.

The subscriber can have multiple IMS devices in operation. These devices can register with the same IMS public user identity, e.g. sip:john.smith@my-company.nl. Each of these devices can, independently, register a DNS service 22 for the domain john.smith.my-company.nl. To cater for such situation, the HSS stores, at any moment, a single network address for the DNS service 22 for the domain john.smith.my-company.nl. For instance, the HSS 8 stores the device based DNS service 22 that registers latest. Hence, one device based DNS service 22 replaces the other when it registers. Alternatively. The HSS 8 stores the device based DNS service 22 that registers first. Hence, registration of a new device based DNS service is not accepted if there is already a device based DNS service registered.

The method herein can be expanded to allow for a distributed DNS service, whereby multiple devices 2 of a subscriber (e.g. john.smith.my-company.nl) have a DNS service 22 associated with this domain. This can be done, for example, by letting the HSS 8 forward the DNS request to multiple devices 2 that have deposited the network address for their DNS service and then construct an aggregate DNS result, based on the respective responses received from these devices. Optionally, at any one moment, a DNS service request is forwarded to at most one device.

However, other modifications, variations, and alternatives are also possible. The specifications, drawings and examples are, accordingly, to be regarded in an illustrative sense rather than in a restrictive sense.

Generally, the invention relates to a subscriber's device 2 being a multimedia device for an IP multimedia network 1. The device 2 or an auxiliary device 24A. 24B communicatively connectable to the device 2 comprises a processing unit 26, 27 arranged for executing at least one IP service application 20A, 20B. The device 2 further includes a DNS query receiver 21 for receiving a DNS query. The device 2 further includes a requesting unit 3 for requesting an identifier of the at least one IP service application. The identifier can include a network address at which the at least one IP service application is accessible. The device 2 comprises the processing unit 26 arranged for executing a DNS service 22 and a memory 30 (arranged for) storing information relating to DNS resource records in accordance with IP service applications that are being executed on the device 2 at that moment. The device 21 further includes a depositing unit 32 arranged for depositing. e.g. during registration, with the multimedia network 1, an indication of the devices capability to execute the DNS service 22. The indication includes a network address on which the DNS service can be reached for a DNS query. The invention also generally relates to a method for providing at least one IP service application from a subscriber's multimedia device 2 in an IP multimedia network 1. The method comprises executing 202 at least one IP service application 20A, 20B on the device 2 and/or on an auxiliary device 24A, 24B associated with the device 2. The method comprises providing 204 a DNS service 22 being executed on the device 2, the DNS service relating to a domain associated with the subscriber. The DNS service 22 has a memory 30 associated therewith. The method includes storing 206 in the memory 30 information relating to DNS resource records in accordance with the at least one IP service application 20A. 20B that is being executed on the device 2 and/or in the auxiliary device 24A, 24B at that moment. The method also includes depositing 212, 216, e.g. during registration, with the IP multimedia network 1, an indication of the device's capability to execute a DNS service 22. The indication includes a network address on which the DNS service can be reached for a DNS query.

Hence, IMS subscribers can install and run IP service applications on their devices. The DNS resource records that are needed for accessing these IP service applications are set and maintained in the device. The device registers the address for its DNS service in the network, e.g. in the HSS. The method and the device form a generic framework for enhancing the usability of IP service applications for end-user devices. IP service applications that are executed on the device and that can be accessed outside the context of a SIP session can allow for many useful applications.

This provides the advantage that an IMS subscriber can install and execute IP service applications on his/her multimedia device, and that these service applications can be used by external users outside the context of a call. Accessing these services is done through a normal DNS resource record query. Optionally, the domain name that is used for accessing these IP service applications (and that is used for the DNS query) is the subscriber's regular public user identity, constructed as an aggregated domain.

The subscriber's device does not deposit this DNS record information in public DNS. The device registers its DNS service address, along with its contact address for DNS services with the IP network. DNS resource records are set and maintained locally in a memory of the device, as required. A DNS query for the domain associated with the subscriber can efficiently be forwarded to the DNS service being executed on the subscriber's multimedia device.

The device can, in this manner, offer IP service applications like an HTTP service, an FTP service etc. Activating or de-activating an HTTP service executed on the device, for example, has no impact on the network information. Activating or de-activating a device based HTTP service results only in an update of the DNS resource records in the device itself.

Other potential use cases include maintaining a picture gallery in a memory of the (mobile) subscriber's multimedia device. Pictures that are taken 'on the go' (or otherwise stored on the device) are kept in the device and are maintained in a local library of the device. Selected viewers have access to an IP service application being executed on the device, which service application gives these viewers access to these pictures stored on the device. The device can execute an IP service application that gives (e.g. restricted) public access to a web page executed on the device, said web page contains information (e.g. still pictures, video footage, geographic coordinates) gathered in real-time by the device.

Roaming to another IP access network or accessing via other IP access network, is transparent for the network. A new IMS registration of the device results in an update of the contact address for the device based DNS server (in the HSS).

The method can be applied as a functional (complementary) enhancement, with suitable device applications, to Business communication suite (BCS). Multimedia telephony (MMTel) or Rich communication suite (RCS).

Although in the examples an IMS network is shown, it will be appreciated that the invention also applies to other IP multimedia networks than IMS networks. For instance, it will be clear that the device itself of FIG. 5 and FIG. 11 is not restricted to use in an IMS network.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

What is claimed is:

1. A method performed by a user equipment (UE), the method comprising:
   transmitting an indication for one or more network nodes in an Internet Protocol (IP) multimedia network to which the UE is communicatively coupled via an IP access network, indicating that the UE provides a Domain Name System (DNS) service for a domain corresponding to a subscriber that is associated with the UE; and
   executing the DNS service on the UE, including dynamically maintaining DNS records in accordance with an IP service application or applications currently offered by the UE.

2. The method of claim 1, wherein transmitting the indication includes indicating a network address, for use in submitting DNS queries to the DNS service.

3. The method of claim 2, wherein the network address corresponds with an IP address provided to the UE by the IP multimedia network, during registration of the UE with the IP multimedia network.

4. The method of claim 3, wherein the network address differs from the IP address provided to the UE during the registration, in terms of a port number.

5. The method of claim 1, wherein the IP multimedia network comprises an IP Multimedia Subsystem (IMS) network.

6. The method of claim 1, wherein at least one of one or more IP service applications for which the UE provides DNS services is configured for machine-to-machine (M2M) communications.

7. The method of claim 1, further comprising receiving a DNS query forwarded to the UE by the IP multimedia network and processing the DNS query via the DNS service provided by the UE.

8. The method of claim 7, wherein processing the DNS query via the DNS service provided by the UE includes transmitting a response to the DNS query, the response including or accompanied by a Time-to-Live (TTL) value for the DNS record or records implicated in the DNS query, and wherein the TTL value is set in dependence on whether the UE is a mobile device.

9. The method of claim 1, wherein dynamically maintaining the DNS records comprises updating the DNS records to reflect changes in a network address of the UE and updating the DNS records to reflect changes in the IP service application or applications that are currently offered by the UE.

10. The method of claim 9, wherein the IP application or applications currently offered by the UE is/are currently executing either on the UE or on an auxiliary device that is communicatively coupled to the UE.

11. The method of claim 1, further comprising executing a service access authorization utility on the UE, to restrict third-party access to the IP application or applications currently offered by the UE.

12. A user equipment (UE) comprising:
communication circuitry configured for communicatively coupling the UE to an Internet Protocol (IP) access network; and
processing circuitry operatively associated with the communication circuitry and configured to:
transmit, via the communication circuitry, an indication for one or more network nodes in an IP multimedia network that is accessible via the IP access network, indicating that the UE provides a Domain Name System (DNS) service for a domain corresponding to a subscriber that is associated with the UE; and
execute the DNS service on the UE, including dynamically maintaining DNS records in accordance with an IP service application or applications currently offered by the UE.

13. The UE of claim 12, wherein the indication includes an indication of a network address, for use in submitting DNS queries to the DNS service.

14. The UE of claim 13, wherein the network address corresponds with an IP address provided to the UE by the IP multimedia network, during registration of the UE with the IP multimedia network.

15. The UE of claim 14, wherein the network address differs from the IP address provided to the UE during the registration, in terms of a port number.

16. The UE of claim 12, wherein the IP multimedia network comprises an IP Multimedia Subsystem (IMS) network.

17. The UE of claim 12, wherein at least one of one or more IP service applications for which the UE provides DNS services is configured for machine-to-machine (M2M) communications.

18. The UE of claim 12, wherein the processing circuitry is configured to receive, via the communication circuitry, a DNS query forwarded to the UE by the IP multimedia network, and process the DNS query via the DNS service provided by the UE.

19. The UE of claim 18, wherein, for processing the DNS query via the DNS service provided by the UE, the processing circuitry is configured to transmit, via the communication circuitry, a response to the DNS query, the response including or accompanied by a Time-to-Live (TTL) value for the DNS record or records implicated in the DNS query, and wherein the TTL value is set in dependence on whether the UE is a mobile device.

20. The UE of claim 12, wherein, for dynamically maintaining the DNS records, the processing circuitry is configured to update the DNS records to reflect changes in a network address of the UE and update the DNS records to reflect changes in the IP service application or applications that are currently offered by the UE.

21. The UE of claim 20, wherein the IP application or applications currently offered by the UE is/are currently executing either on the UE or on an auxiliary device that is communicatively coupled to the UE.

22. The UE of claim 12, wherein the processing circuitry is configured to execute a service access authorization utility on the UE, to restrict third-party access to the IP application or applications currently offered by the UE.

\* \* \* \* \*